United States Patent
Gauthie

(10) Patent No.: US 11,414,173 B2
(45) Date of Patent: Aug. 16, 2022

(54) AIRCRAFT WING UNIT COMPRISING TWO WINGS ATTACHED TO ONE ANOTHER

(71) Applicant: AIRBUS OPERATIONS (S.A.S.), Toulouse (FR)

(72) Inventor: Laurent Gauthie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 358 days.

(21) Appl. No.: 16/724,443

(22) Filed: Dec. 23, 2019

(65) Prior Publication Data

US 2020/0207455 A1    Jul. 2, 2020

(30) Foreign Application Priority Data

Dec. 26, 2018    (FR) ...................................... 18 74143

(51) Int. Cl.
| | | |
|---|---|---|
| B64C 1/26 | (2006.01) | |
| B64F 5/10 | (2017.01) | |
| B64C 1/06 | (2006.01) | |
| B64C 3/18 | (2006.01) | |

(52) U.S. Cl.
CPC ................ B64C 1/26 (2013.01); B64C 1/061 (2013.01); B64C 3/187 (2013.01); B64F 5/10 (2017.01); B64C 2211/00 (2013.01)

(58) Field of Classification Search
CPC ....... B64C 1/061; B64C 2211/00; B64C 1/26; B64C 3/187; B64F 5/10
See application file for complete search history.

(56) References Cited

U.S. PATENT DOCUMENTS

| | | | |
|---|---|---|---|
| 9,688,382 B2 | 6/2017 | Delahaye et al. | |
| 10,040,536 B2 * | 8/2018 | Charles | ................... B64C 3/182 |
| 2009/0159742 A1 * | 6/2009 | Ramirez Blanco | ....... B64C 5/02 244/131 |
| 2012/0043422 A1 | 2/2012 | Campana | |
| 2014/0084110 A1 | 3/2014 | Rea | |
| 2014/0158828 A1 | 6/2014 | Loyant et al. | |
| 2017/0081015 A1 * | 3/2017 | Charles | ................... B64C 3/182 |

FOREIGN PATENT DOCUMENTS

| | | | |
|---|---|---|---|
| EP | 3 674 204 A1 | 7/2020 | |
| EP | 3 674 204 B1 | 9/2021 | |
| ES | 2351823 B1 * | 12/2011 | ............... B64C 5/02 |
| FR | 2 948 099 A1 | 7/2009 | |
| GB | 2 435 457 A | 8/2007 | |
| JP | 2008-114707 A | 5/2008 | |
| RU | 2 481 243 C1 | 5/2013 | |

OTHER PUBLICATIONS

French Search Report for Application No. 18 74143 dated Aug. 16, 2019.

* cited by examiner

*Primary Examiner* — Philip J Bonzell
(74) *Attorney, Agent, or Firm* — Jenkins, Wilson, Taylor & Hunt, PA

(57) ABSTRACT

To facilitate the assembly of the wing unit of an aircraft, this wing unit includes two wings each having a lateral wing box extended toward the interior by a center wing box half having an interior end, the two wings being attached to one another using attachment bolts linking the two interior ends of the two center wing box halves, and passing through an intermediate wall connecting two fuselage frame walls.

20 Claims, 8 Drawing Sheets

AIRCRAFT WING UNIT COMPRISING TWO WINGS ATTACHED TO ONE ANOTHER

CROSS-REFERENCE TO RELATED APPLICATION

This application claims priority to French patent application FR 1874143 filed Dec. 26, 2018, the entire disclosure of which is incorporated by reference herein.

TECHNICAL FIELD

The disclosure herein relates to the field of aircraft wing units, and in particular to the attachment of the two wings of this wing unit to the fuselage.

The disclosure herein relates to any type of aircraft, in particular to commercial and military planes.

BACKGROUND

The two wings of an aircraft are normally attached separately from one another, on the skeleton of this aircraft. More precisely, the fuselage of the aircraft includes a skeleton within which is integrated a center wing box, at the lateral ends of which the two wings are attached respectively.

Such an aircraft wing unit design, although widespread and notably known from the document FR 2 948 099 A1, requires substantial time for assembling the wings on the center box.

SUMMARY

A first object of the disclosure herein is to address the disadvantage mentioned above.

The disclosure herein is thus radically distinct to the earlier designs, by proposing to directly link the two wings to one another. This characteristic feature is obtained by integrating a center wing box half on each wing, and by linking, by bolts, the interior ends of these two box halves. Once these two ends are attached to one another, the center wing box is restored. Moreover, the mechanical strength of the assembly comprising the two wing box halves is reinforced by the presence of the intermediate wall through which the bolts pass.

The assembly of the wing unit is thus advantageously simplified, and reinforced.

The disclosure herein preferably provides at least one of the following optional features, taken separately or in combination.

The attachment bolts are distributed entirely along the interior ends of the two center wing box halves, these ends preferably having a rectangular general shape.

The interior end of each center wing box half has attachment fittings through which the attachment bolts pass, the attachment fittings being placed on an interior surface of the center wing box half and on an outer surface thereof.

Each wing includes an interior transverse rib between the lateral wing box thereof and the center wing box half thereof.

Each center wing box half has a section which enlarges with proximity to the interior end thereof.

Preferably, the aircraft further comprises a third fuselage frame, a lower part of which is also in frame wall form, the third frame being arranged such that the second frame is then arranged between the first and third frames according to a longitudinal direction of the aircraft, and the two frame walls of the second and third frames are connected by an intermediate wall falling within the vertical midplane of the aircraft.

In this embodiment, the two intermediate walls are two pieces separate from one another, arranged on either side of the frame wall of the second frame, or the two intermediate walls are produced using a same piece, on either side of which two parts of the frame wall of the second fuselage frame are arranged.

Preferably, at least one of the attachment fittings of the interior end of each center wing box half includes:
- a first part through which at least one of the attachment bolts also passing through the intermediate wall, passes;
- a second part through which at least one additional bolt also passing through the frame wall of one of the first and second frames, passes;
- a third part through which at least one additional bolt also passing through a box element of the center wing box half, passes, the first, second and third parts of the attachment fitting being orthogonal with respect to one another such as to form a corner fitting.

Preferably, the frame wall of the frame of the first and second fuselage frames which is located the most rearward, forms a front demarcation of a main-landing-gear compartment.

Preferably, each of the first and second fuselage frames is attached to a load distributing plate having lateral edges attached to a fuselage skin. The same preferentially applies to the third fuselage frame, when it is provided and used in the manner disclosed above.

Preferably, the attachment bolts are oriented parallel to a transverse direction of the aircraft.

Finally, an object of the disclosure herein is a method for assembling an aircraft comprising a step for assembling the two wings to one another, using the attachment bolts linking the interior ends of the two center wing box halves, and passing through the intermediate wall.

Other advantages and features of the disclosure herein will emerge from the nonlimiting detailed description hereafter.

BRIEF DESCRIPTION OF THE DRAWINGS

This description will be given with respect to the appended, example drawings wherein.

DETAILED DESCRIPTION

Figure 1:
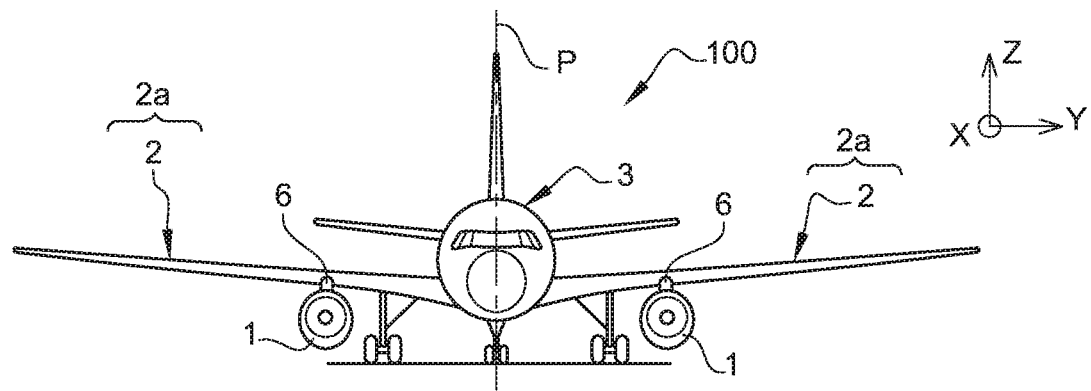
FIG. 1 represents a front plan of an aircraft according to the disclosure herein.

Referring to FIG. 1, the latter represents an aircraft 100 comprising a fuselage 3, and two wings 2 forming the wing unit 2a of the aircraft. These wings 2 are attached to a skeleton of the fuselage, and also directly attached to one another as will be described hereafter. They each carry a turbine engine 1 such as a turbojet, via an engine pylon 6. Preferably, each wing 2 has an aerodynamic part, the span of which exceeds 20 meters.

Throughout the following description, the direction X corresponds to the longitudinal direction of the aircraft, the direction Y corresponds to the transverse direction thereof, whereas the direction Z corresponds to the vertical direction or the height direction. These three directions X, Y and Z are orthogonal with respect to one another.

Figure 2:
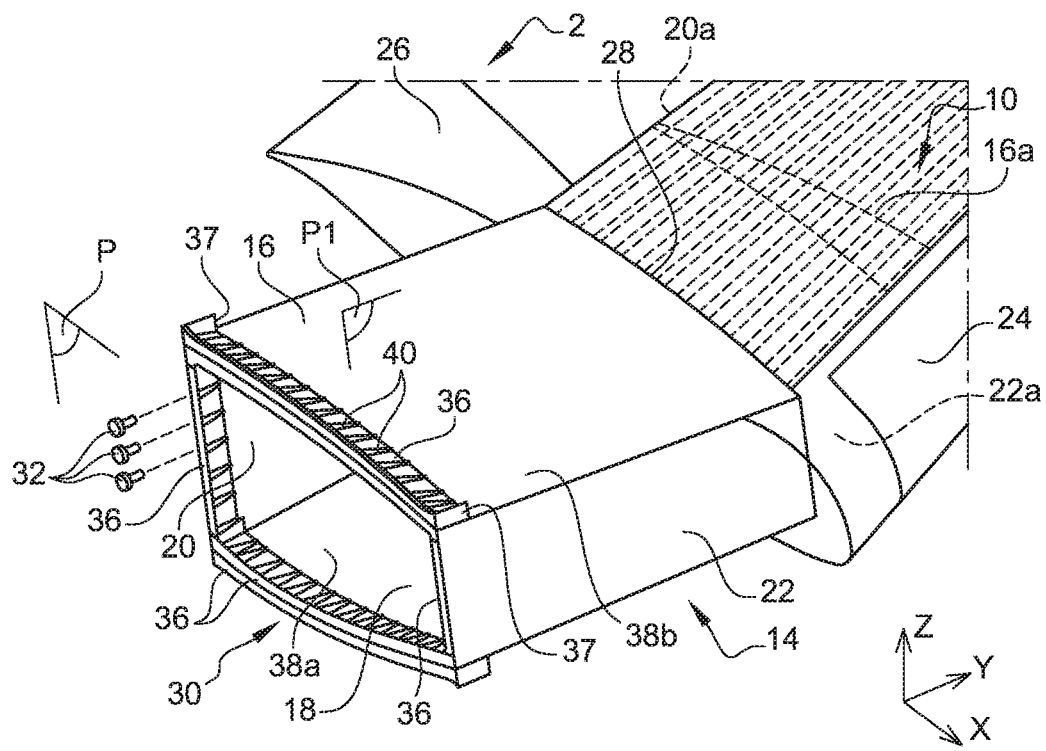
FIG. 2 represents a perspective view of a part of one of the two wings of the aircraft shown in the previous figure.
Figure 3:
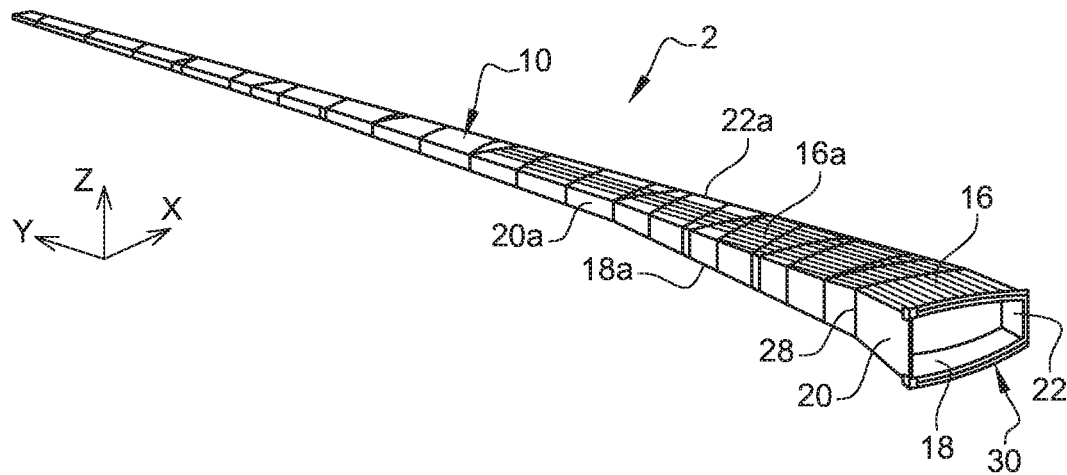
FIG. 3 represents a perspective view of the structural part of the wing shown in the previous figure.
Figure 4:
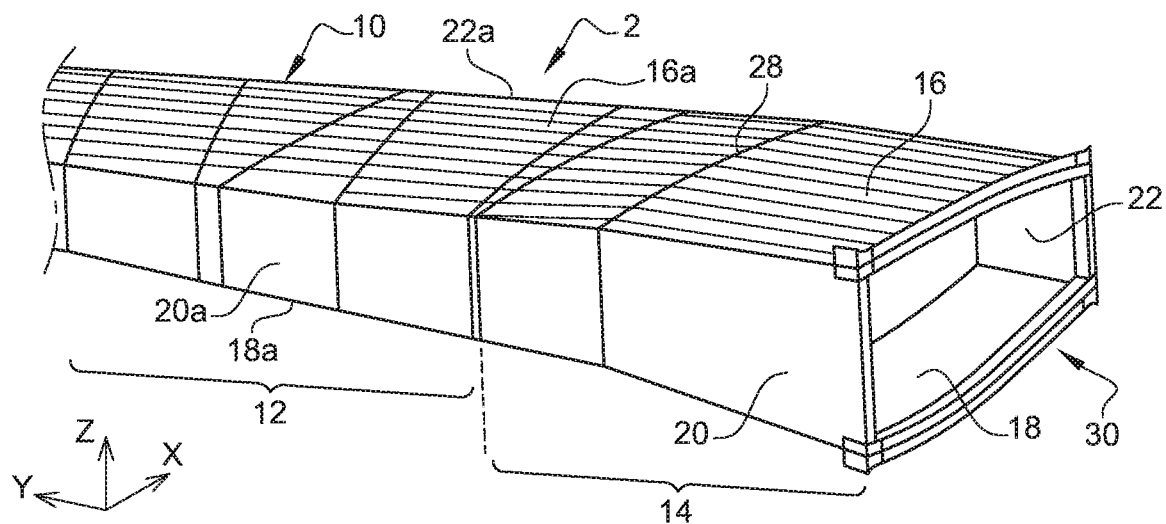
FIG. 4 represents an enlarged perspective view of a portion of the structural part of the wing shown in the previous figure.

Referring now to FIGS. 2 to 4, the latter provide a more detailed view of a part of one of the two wings 2. The other wing has an identical design, symmetrical with respect to a vertical midplane P of the aircraft, including the longitudinal central axis thereof.

The wing 2 comprises a structural part 10 composed of a lateral wing box 12, and of a center wing box half 14 extending the box 12 transversally toward the interior. The box 12 and the box half 14 are thus integrated within a same structure which is then intended to be assembled on the skeleton of the fuselage. Each of them has a cross-section with a parallelepiped general shape, and a continuous shape is retained at the junction between the box 12 and the box half 14. In this respect, it is noted that the center wing box half 14 has an upper spar 16, a lower spar 18, a rear spar 20 and a front spar 22. It is noted that the upper 16 and lower 18 spars are also called upper and lower panels, respectively. Nevertheless, in the remainder of the description, these will be referred to as upper and lower spars.

The same applies to the lateral wing box 12, the corresponding elements of which have been identified with the same reference number, followed by the extension "a". Thus, the two upper spars 16, 16a are continuous with one another. They can be produced using several elements attached to one another, or using a unitary single piece. The same applies to the lower spars 18, 18a, to the rear spars 20, 20a, and to the front spars 22, 22a.

The center wing box half 14 is provided to be attached in the skeleton of the fuselage. By contrast, the lateral wing box 12 corresponds to the part of the wing intended to project from the fuselage, carrying aerodynamic portions like a leading edge 24 and a trailing edge 26, which are represented in FIG. 2.

The lateral wing box 12 extends in a wingspan direction having an inclination with respect to the direction Y, whereas the center wing box half 14 extends in this same direction Y. In other words, a longitudinal central axis of the box half 14, with a parallelepiped general shape, is substantially parallel to the direction Y. According to an alternative, the two front spars 22, 22a could both be arranged in the wingspan direction of the wing, still in continuation with one another.

Interior transverse ribs are provided on the box 12 and the box half 14. Among these, a transverse rib 28 is located at the junction between the box 12 and the box half 14, i.e. at the break marked by the difference in orientation between these two elements 12, 14 forming the structural part 10 of the wing.

The box half 14 has a cross-section, in a plane XZ, which enlarges with proximity to the interior. Preferably, this increase in section is obtained by providing an upper spar 16 that is substantially planar and substantially parallel to a plane YZ, whereas the lower spar 18 is inclined such as to extend downward with proximity to the interior. Keeping an upper spar 16 substantially planar and parallel to a plane YZ makes it possible to easily install the floor of the passenger cabin above this spar, by attaching floor elements like longitudinal members and/or cross members on the upper surface of this spar 16. Furthermore, the inclination of the lower spar 18 makes it possible to have a box half 14, the interior end 30 of which has a greater dimension than the exterior end corresponding to the junction with the lateral box 12. As this interior end 30 is intended to be attached to the skeleton of the fuselage, the large size thereof makes it possible to optimize the mechanical junction between these two elements. Moreover, since all or some of the interior of the box is intended to store fuel, this enlargement of the box half 14 makes it possible to increase the storage capacity for fuel.

The interior end 30 of the box half 14, corresponding to the part of the box half that is located closest to the vertical midplane P in the direction Y, has a rectangular general shape. As will be described hereafter, it is the interior end 30 that is intended to be attached to the fuselage skeleton and to the interior end of the other wing, using attachment bolts 32. These bolts, some of which have been represented in FIG. 2, are distributed entirely along the interior end 30 of the box half 14. As a result, attachment bolts 32 engage each of the spars 16, 18, 20, 22 of the box half. The attachment bolts 32 have technical features suited to each local requirement. These can be shear bolts, tension bolts, or shear and tension bolts.

For this purpose, at the interior end 30, the spars 16, 18, 20, 22 are provided with attachment fittings 36 mounted on the interior surface 38a and on the exterior surface 38b of the box half 14. More precisely, one or more attachment fittings 36 are placed and mounted on the interior surface and/or on the exterior surface of each of the four spars 16, 18, 20, 22. In the example represented in the figures, the upper 16 and lower 18 spars are provided with attachment fittings 36 placed on the interior and exterior surfaces thereof, while the rear 20 and front 22 spars are provided with attachment fittings 36 placed only on the interior surface thereof.

Figure 5:
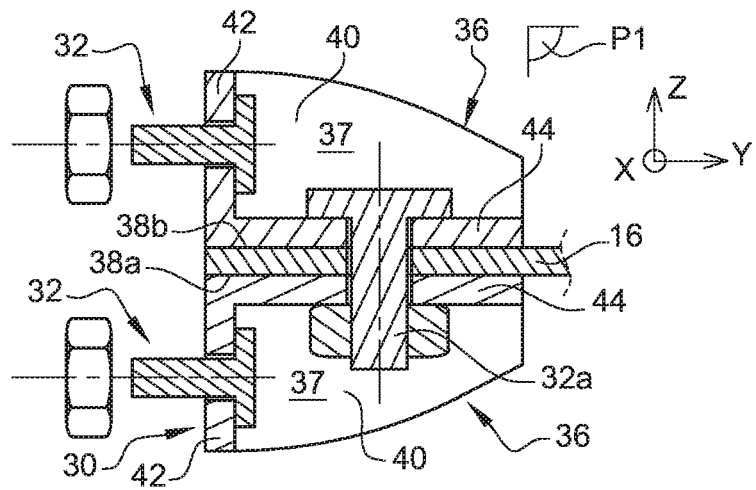
FIG. 5 represents a sectional view of a part of the center wing box half of the wing shown in FIGS. 2 to 5, along the cutting plane P1 of FIG. 2.

Referring to FIG. 5 representing the interior end of the upper spar 16, this shows that this end is indeed provided with two attachment fittings 36 arranged on either side, namely on the exterior surface 38b and on the interior surface 38a. Each fitting 36 has a section with an overall L shape, with ribs 40 linking the free leg and the base of the L. Between the ribs 40, each fitting 36 defines a space 37 housing one or more attachment bolts 32 passing through the free leg 42 of the L. This space 37 also houses one or more additional bolts 32a attaching the base 44 of the L on the spar 16. A same additional bolt 32a can clamp the spar 16 and the base 44 of the two fittings 36 located on either side of this spar, as has been represented in FIG. 5.

The attachment bolts 32 thus extend entirely along the interior end 30 of the wing box half 14, following a substantially rectangular line corresponding to the shape of this end 30. There can be a large number of these bolts 32, for example more than one hundred.

Figure 6:
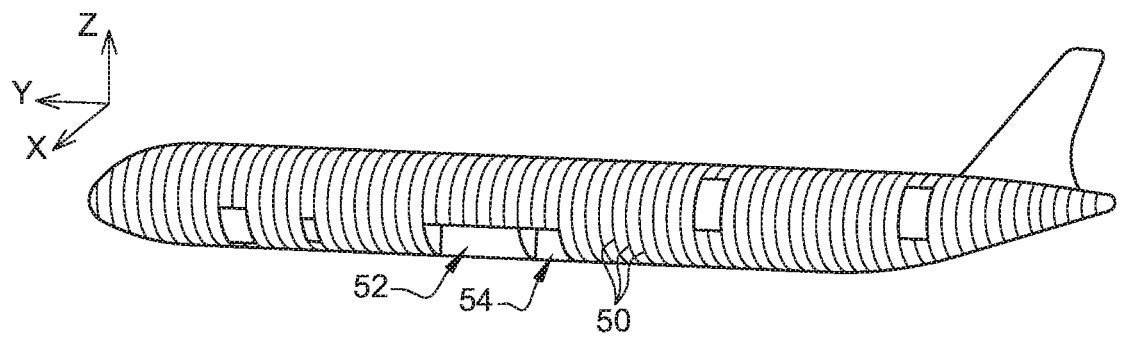
FIG. 6 represents a perspective view of the fuselage skeleton on which the wing unit shown in the previous figures is intended to be attached.
Figure 7:
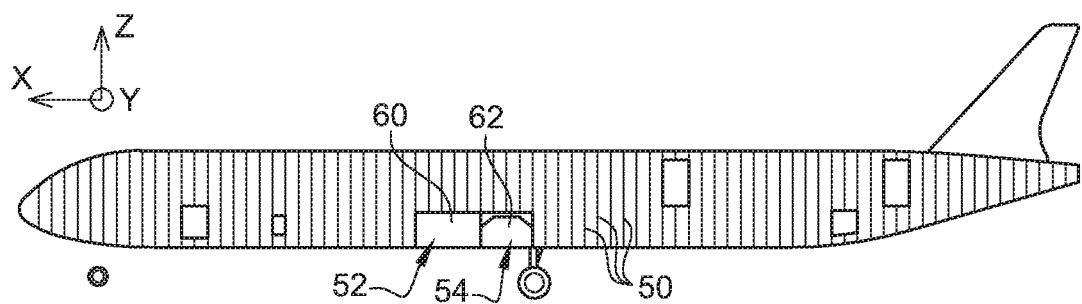
FIG. 7 is a side view of the skeleton shown in FIG. 6.

FIGS. 6 and 7 represent the fuselage skeleton of the aircraft, this skeleton being, in particular, provided with fuselage frames 50 arranged in transverse planes YZ, and spaced apart from one another in the direction X. At a central part of this skeleton, a lower zone 52 is dedicated to receiving the wing unit. This zone 52 is adjacent to a main-landing-gear compartment 54, located behind the zone 52 receiving the wings.

Figure 8:
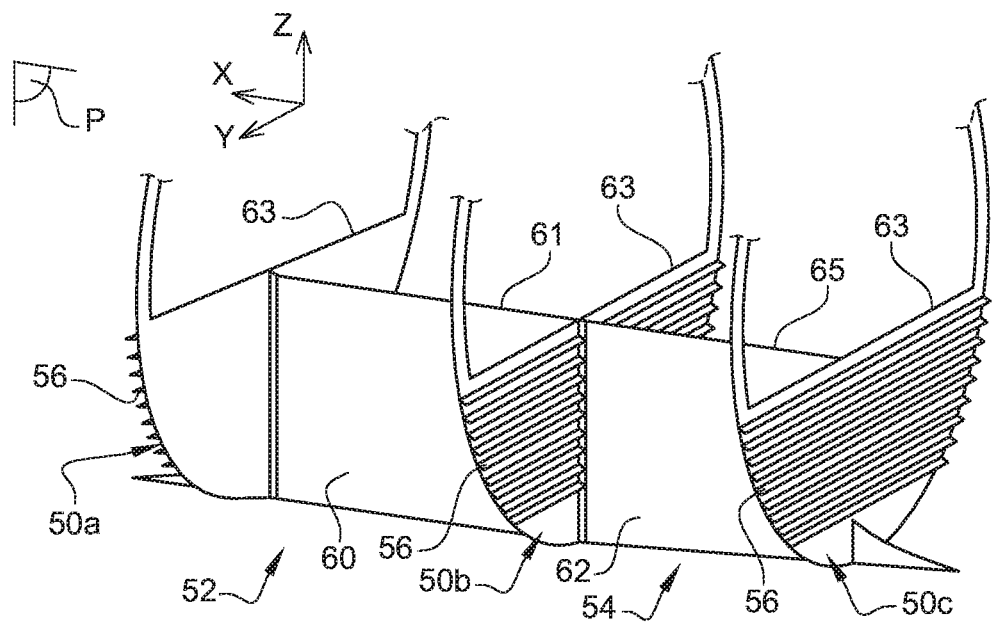
FIG. 8 is an enlarged perspective view of a central part of the fuselage skeleton intended to receive the wing unit of the aircraft.

More precisely and with reference to FIG. 8, the latter represents three fuselage frames distributed in the direction X, these three frames being referenced as 50a, 50b, 50c, respectively, from the front to the rear. These three frames are so-called "main" frames, in that they actively participate in the absorption and in the transfer of the loads within the structure. Other frames, not represented and called "formers", can nevertheless be inserted between the main frames 50a-50c. They also participate in the absorption and the transfer of the loads, but to a lesser extent with respect to the main frames. The latter are placed such that the second frame 50b is arranged between the first and third frames 50a, 50c, in the direction X.

Each frame 50a-50c has a substantially circular or oval general shape, with an open upper part and a lower part forming a solid wall 56. These walls 56 also fall within transverse planes YZ. They can be reinforced, notably for the purpose of forming sealed bottoms in the case of the front wall 50a, and of the rear wall 50c.

In the direction X, the walls 56 of the two first fuselage frames 50a, 50b define the zone 52 for receiving the wings, whereas the walls 56 of the two most rearward frames 50b, 50c define the compartment 54 for receiving the main landing gear. These two zones 52, 54 are not pressurized.

The walls 56 of the first two fuselage frames 50a, 50b are connected in a fixed manner by an intermediate wall 60, which falls within the vertical midplane P of the aircraft. The height of this intermediate wall 60 corresponds to the height of the frame walls 56 in the plane in question. It is attached by conventional structure, for example brackets and bolts. The upper edge 61 of the vertical intermediate wall 60 is substantially in a same plane XY as that of the upper edge 63 of the two frame walls 56.

In a similar manner, the walls 56 of the last two fuselage frames 50b, 50c are connected in a fixed manner by another intermediate wall 62, which also falls within the vertical midplane P of the aircraft. The height of this intermediate wall 62 also corresponds to the height of the frame walls 56. It is attached by conventional structure, for example brackets and bolts. The upper edge 65 of this vertical intermediate wall 62 is therefore substantially in the same plane XY as that of the upper edge 63 of the two frame walls 56. In this respect, it is noted that the aforementioned plane XY corresponds substantially to the plane in which a floor of the aircraft is inscribed, for example the floor of the passenger cabin. The upper edges 61, 63, 65 can thus be used as a support for the installation of floor elements (which are not represented), such as longitudinal members or cross members.

In the example shown in FIG. 8, the intermediate walls 60, 62 are two separate pieces split by the wall 56 of the middle frame 50b, called the second frame. Another solution can consist in or comprise providing a single piece to form the two intermediate walls 60, 62, and in designing the wall 56 of the middle frame 50b in two parts, which are arranged on either side, respectively, of this new single piece oriented in the plane P.

Figure 9:
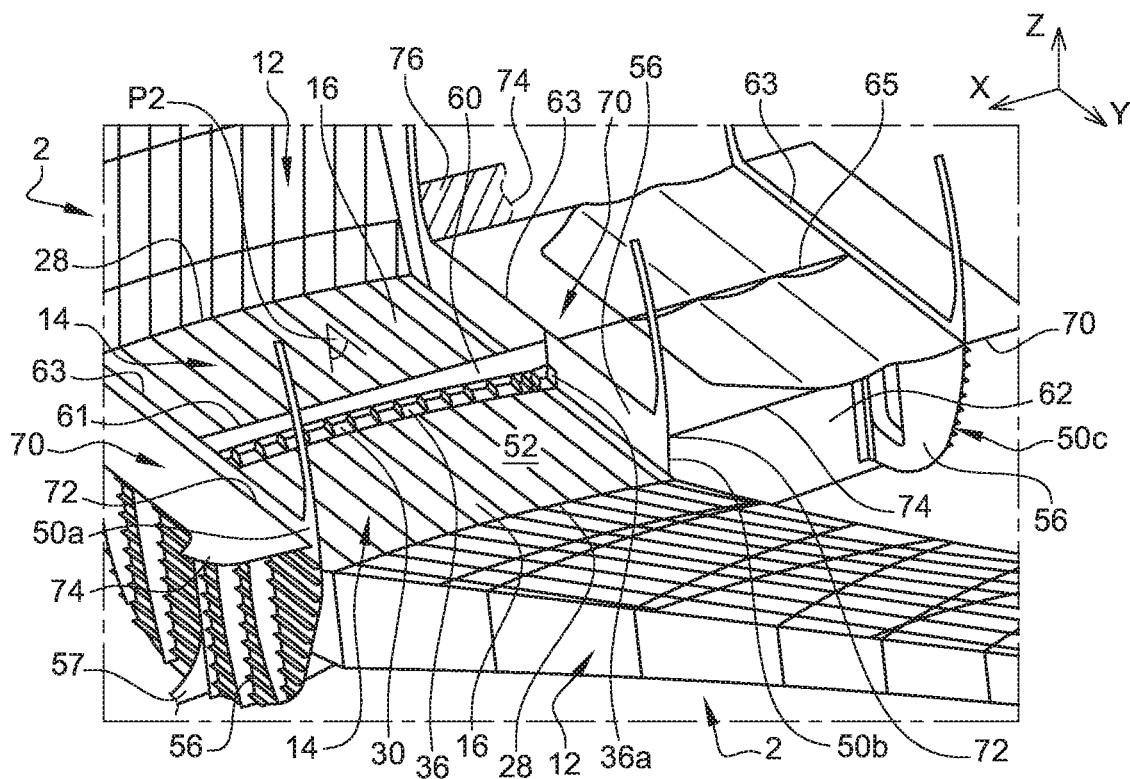
FIG. 9 represents a perspective view of the combination between the fuselage skeleton of FIGS. 6 to 8, and the wings of FIGS. 2 to 5.
Figure 10:
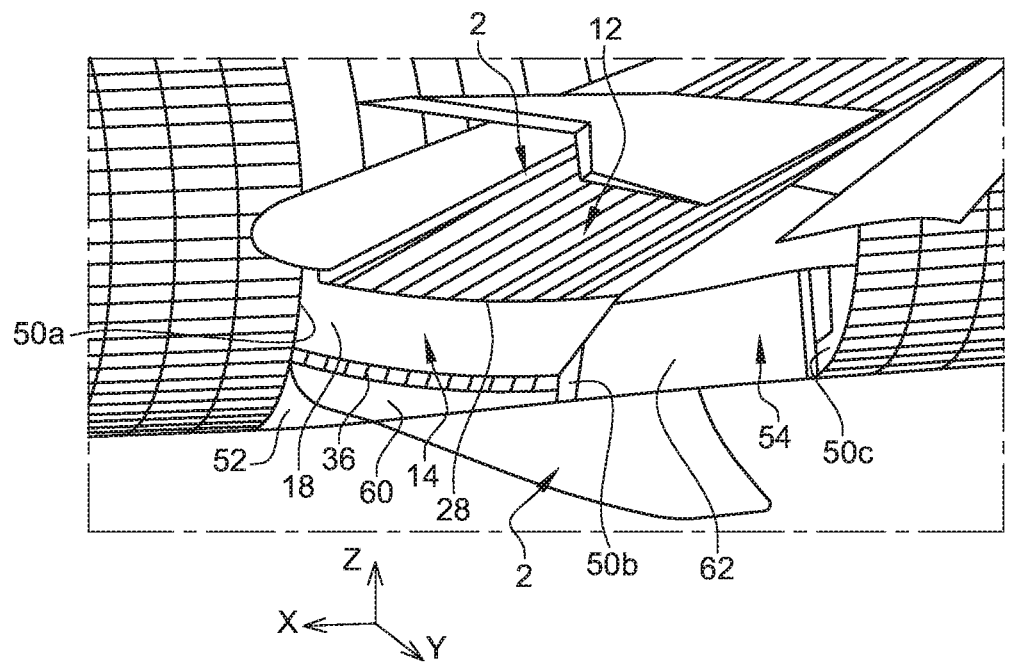
FIG. 10 represents a perspective view similar to the previous one, from another viewing angle.
Figure 11:
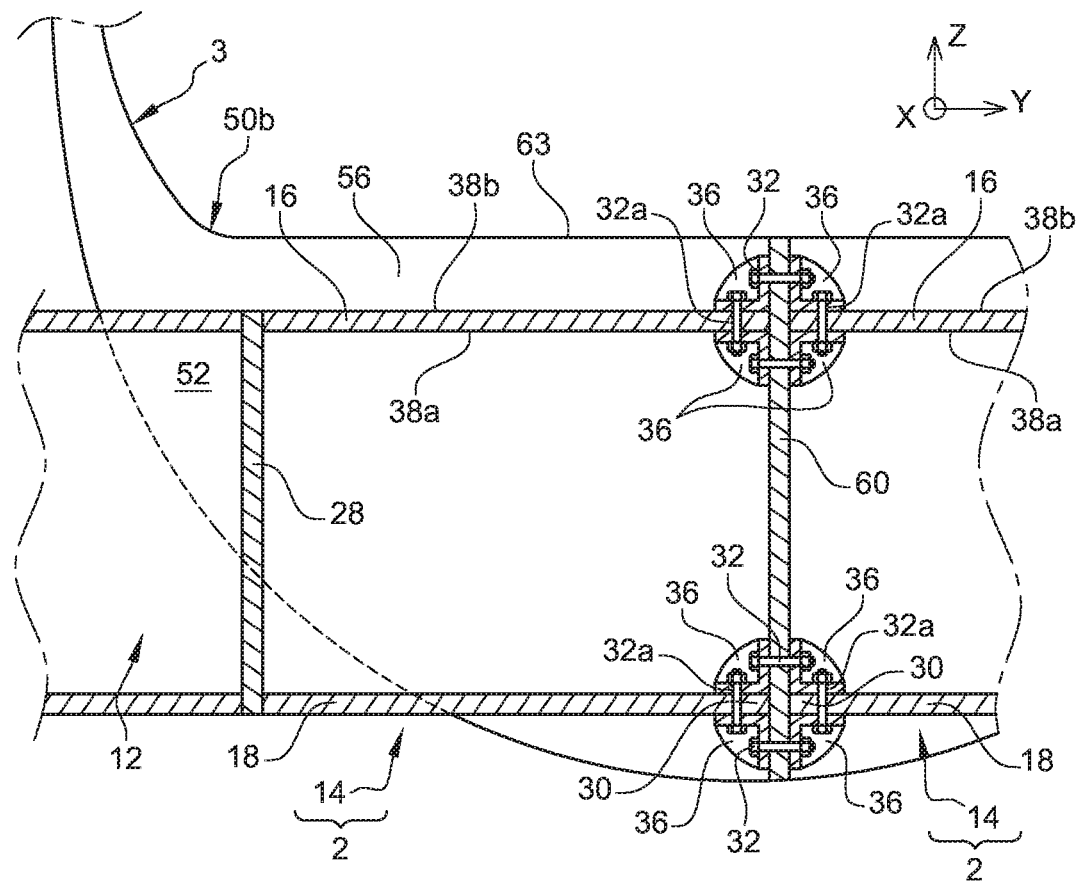
FIG. 11 represents a sectional view of the combination shown in FIGS. 9 and 10, according to the cutting plane P2 of FIG. 9.

Referring to FIGS. 9 to 11, these represent the installation of the two wings 2 in the lower zone 52, between the two frame walls 56 of the two frames 50a, 50b. As can be better seen in FIG. 11 (in which the lower spar 18 of each box half 14 has been represented in a non-inclined manner), the two interior ends 30 of the two box halves 14 are indeed linked by the attachment bolts 32 which pass through not only the attachment fittings 36, but also the vertical intermediate wall 60. The attachment bolts 32 are furthermore preferentially oriented in the direction Y, namely substantially orthogonally with respect to the intermediate wall 60 that they pass through.

Figure 9A:
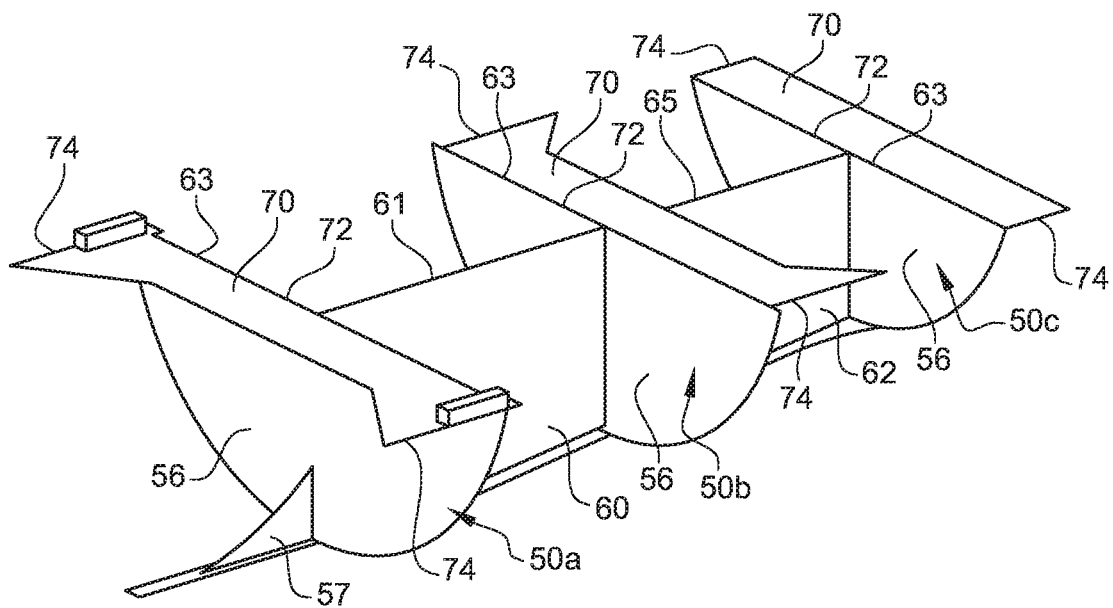
FIG. 9a represents a perspective view of the fuselage skeleton shown in FIG. 9.

Thanks to this design, the loads in the direction X pass through center wing box halves 14 in the direction of the intermediate wall 60, which then diffuses these axial loads into the other elements of the skeleton of the fuselage. For example, the three frames 50a-50c can each be associated with a load distributing plate as is shown in FIGS. 9 and 9a. Each load distributing plate 70 extends preferentially in a plane XY, corresponding to the plane of the upper edges 61, 63, 65, or to a slightly lower parallel plane. Each plate 70 thus includes an edge 72 close and parallel to the upper edge 63 of the associated frame wall 56 thereof, on which this edge 72 is attached. From the latter, the plate 70 extends frontward or rearward exhibiting lateral edges 74 attached to the fuselage skin 76, represented only in a brief and simplistic manner. After having passed through the intermediate wall 60, the frame walls 56, and the distributing plates 70 associated with the two fuselage frames 50a, 50b, the axial loads can then be distributed into the fuselage skin surrounding the skeleton. In the same way, after having been introduced into the middle frame 50b, the axial loads spread rearward into the intermediate wall 62, into the wall 56 of the frame 50c, and then into the load distributing plate 70 which is attached to this rear frame 50c.

FIGS. 9 and 9a also show that, at the front of the wall 56 of the first fuselage frame 50a, there is provided, at the lower part, a web 57 which helps to absorb the axial loads. Indeed, this web 57 is arranged in the same plane XZ as that of the intermediate wall 60. The rear end thereof is attached to the wall 56 of the first fuselage frame 50a, while the lower edge thereof is attached to the fuselage lower skin. Finally, the upper edge thereof is beveled such as to give this web 57 a triangular general shape, although this upper edge can adopt a slightly curved shape as has been represented in FIGS. 9 and 9a. In this case also, the web 57 could be separate from the intermediate wall 60 that it extends, or indeed be integrated therewith such as to form a single piece.

Figure 9B:
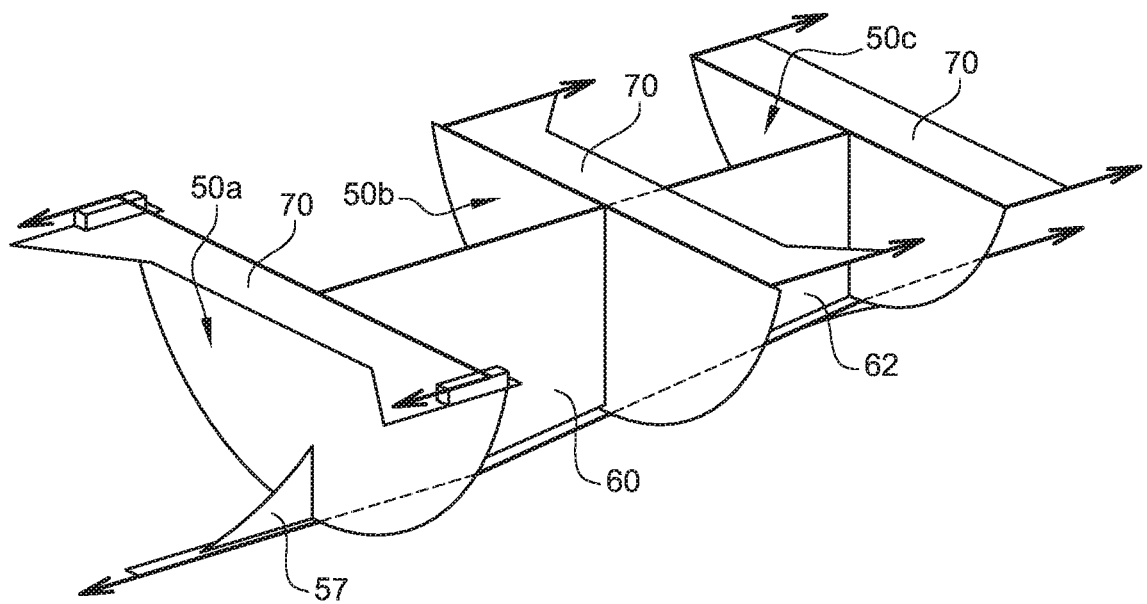
FIG. 9b is a perspective view similar to that of the previous figure, illustrating the absorption of the axial loads.

FIG. 9b illustrates, with the arrows, the absorption of the axial loads that is performed by the structure specific to the disclosure herein, and which has just been described above.

Figure 9C:
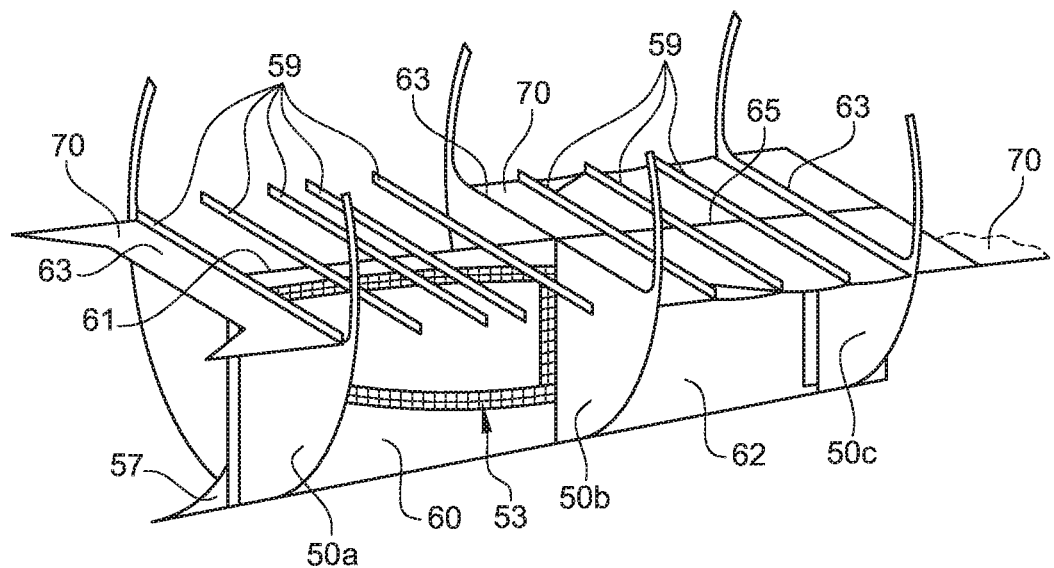
FIG. 9c represents a view similar to that of FIGS. 9a and 9b, in which the floor cross beams have been represented.

Furthermore, FIG. 9c shows that the adopted design allows for perfect installation of the cross beams 59 of the floor of the passenger cabin, above the upper edges 61, 63, 65. At this location, the cross beams 59 can easily be deformed by bending, and thus considerably limit the risks of these beams breaking. The deformation is allowed by the vertical space existing between these beams 59 and each box half 14, the positioning impression 53 of which on the intermediate wall 60 has also been represented in FIG. 9c.

As regards the absorption of the transverse loads according to the direction Y, the attachment fittings arranged at the front and rear ends of the interior ends 30 can form corner fittings in order to be also attached to the frame walls 56. One of these fittings, also called a case corner fitting, is referenced as 36a in FIG. 12. This corner fitting 36a also corresponds to that referenced in FIG. 9.

Figure 12:
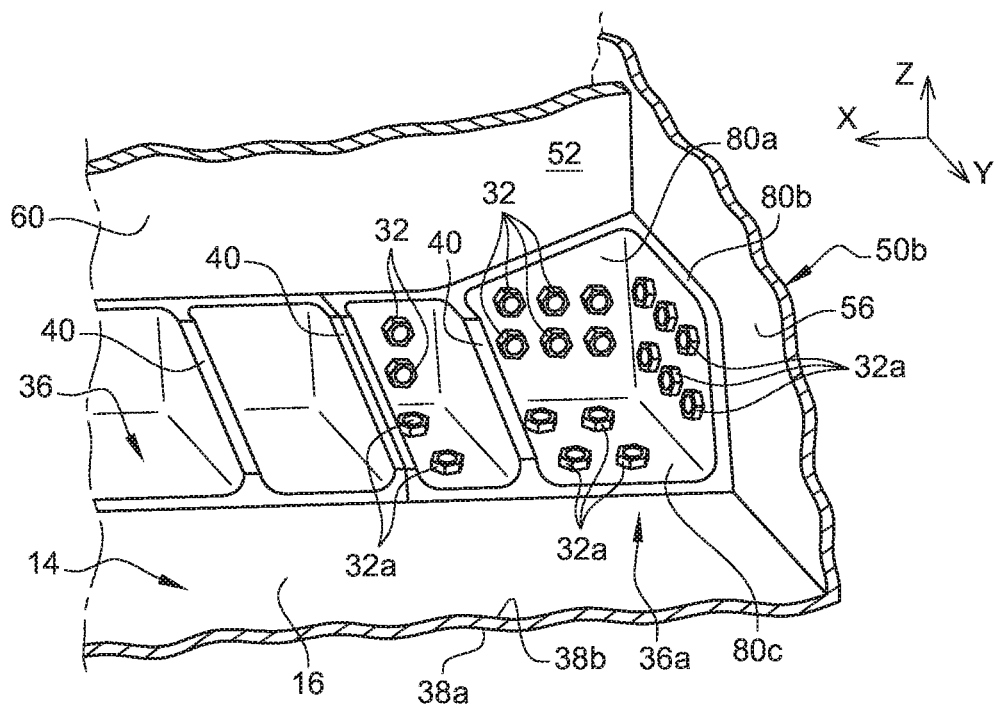
FIG. 12 represents a perspective view of one of the corner fittings linking the center wing box half to one of the fuselage frames.
Figure 13:
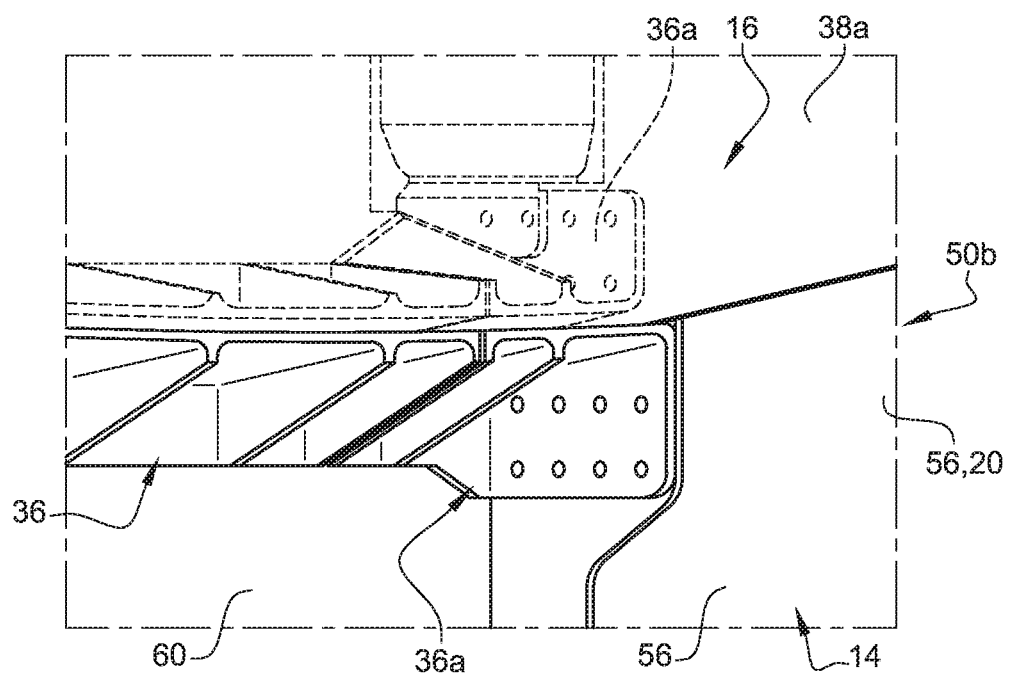
FIG. 13 represents a perspective view similar to that of the previous figure, showing another corner fitting.

In FIG. 12, the fitting 36a is attached to the exterior surface 38b of the rear end of the upper spar 16, in order to engage the middle frame 50b. Nevertheless, such a fitting can be installed at the front and/or at the rear, on the upper spar 16 and/or on the lower spar 18, on the interior surface 38a and/or on the exterior surface 38b of each box half 14. Preferably, such fittings 36a with identical or similar designs are provided in all of the aforementioned locations, such that eight of these fittings are associated with each center wing box half 14. In this respect, FIG. 13 represents another corner fitting 36a located inside the box half 14, and linking the interior surface 38a of the box half 14 to the intermediate wall 60, and to the frame wall 56 of the frame 50b.

Returning to FIG. 12, the corner fitting 36a firstly includes a first part 80a oriented in a plane XZ, and bearing against the intermediate wall 60. This first part 80a has, therethrough, several attachment bolts 32, also passing through the intermediate wall 60. It also includes a second part 80b oriented in a plane YZ, and bearing against the frame wall 56 of the middle frame 50b. This second part 80b has, therethrough, several additional bolts 32a, also passing through the frame wall 56. Finally, the corner fitting 36a includes a third part 80c oriented in a plane XY, and bearing against the exterior surface of the upper spar 16. This third part 80c also has, therethrough, several additional bolts 32a, also passing through the upper spar 16.

Within this fitting 36a, which can also include one or more ribs 40 linking the first and third parts 80a, 80c, the three parts 80a-80c are orthogonal with respect to one another.

Figure 14:
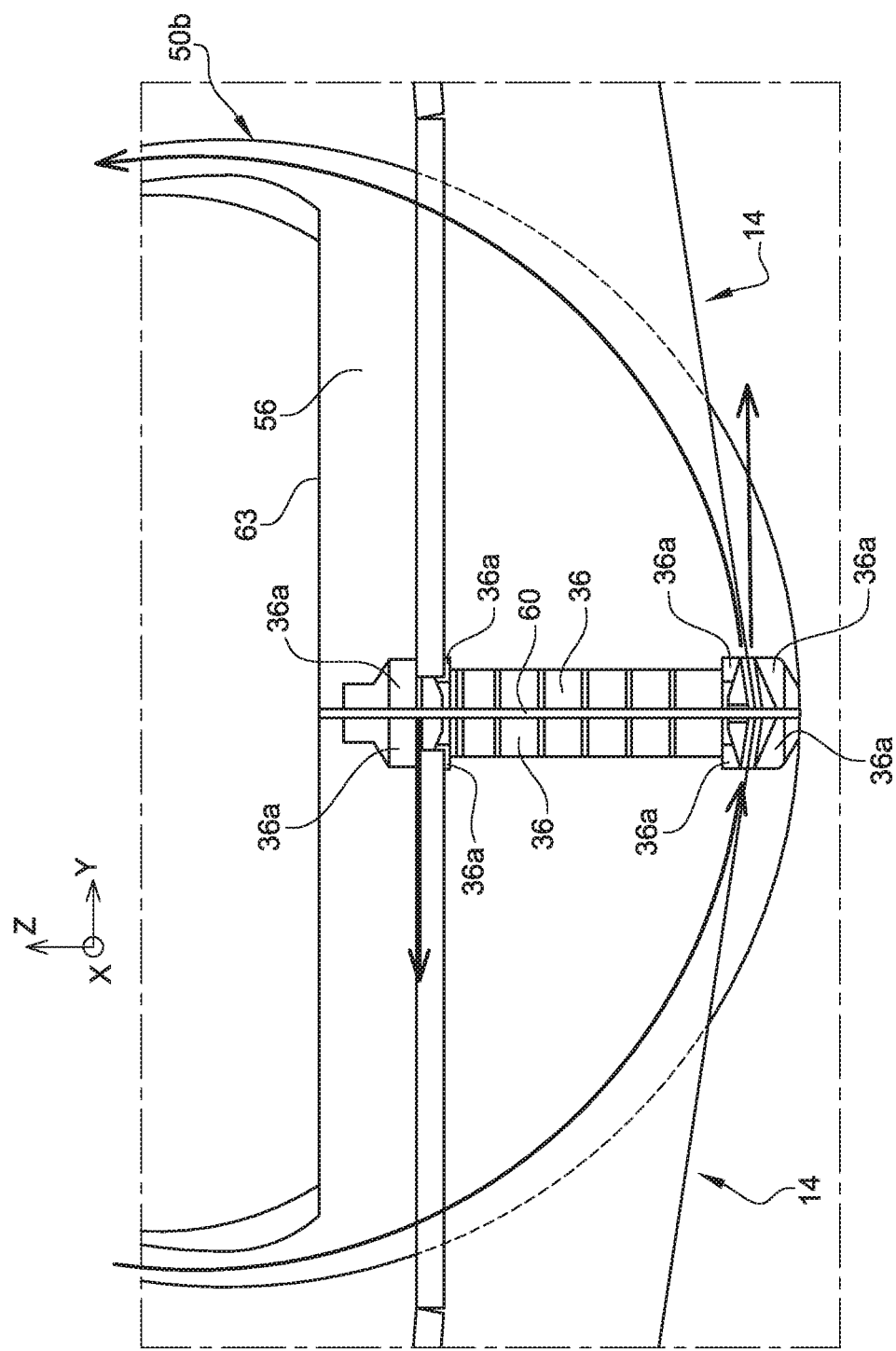
FIG. 14 represents a cross-sectional view of the combination shown in FIG. 9.

The corner fittings 36a allow the introduction of the transverse loads, which are exerted in the direction Y, directly into the walls 56 of the fuselage frames 50a, 50b, without stressing the intermediate wall 60 of the fuselage skeleton. The transverse loads are then spread into the other parts of the fuselage frames, and then into the fuselage skin. The arrows in FIG. 14 illustrate this transfer of the transverse loads from the corner fittings 36a directly into the frame wall 56 of the fuselage frame 50b, then the spreading of the loads within this frame 56.

With this design, two wings 2 are assembled on the fuselage skeleton simultaneously, using the attachment bolts 32 linking the two interior ends 30 to one another. When passing through the ends 30 of these two center wing box halves 14, the bolts 32 also pass through the intermediate wall 60 which is integrally formed with the fuselage skeleton. As a result, the attachment of the two wings 2 to one another, using the bolts 32, at the same time results in the attachment of these wings to the fuselage 3.

The assembly of the wings is advantageously simplified thereby.

Preferably, each wing 2 is assembled on the fuselage skeleton while being pre-equipped, notably with the leading and trailing edges thereof. This advantageously makes it possible to test the functionalities associated with the wing before it is installed on the fuselage skeleton. Nevertheless, this equipment could alternatively be installed on the structural part 10 of the wings, only after this structural part has been attached to the fuselage skeleton, without departing from the scope of the disclosure herein.

Of course, various modifications can be made by a person skilled in the art to the disclosure herein that has been described above, solely as nonlimiting examples, and the scope of which is defined by the appended claims.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a wing unit comprising two wings, wherein each wing has a lateral wing box, wherein each lateral wing box is extended toward an interior by a respective center wing box half, each of which has an interior end, and wherein the two wings are attached to one another using attachment bolts, which link the interior ends of the two center wing box halves together; and
   at least a first fuselage frame and a second fuselage frame, each of which has a lower part in a form of a frame wall, wherein the frame wall of the first fuselage frame and the frame wall of the second fuselage frame are connected to each other by an intermediate wall, which is positioned in a vertical midplane of the aircraft, wherein the intermediate wall is between the two center wing box halves and is crossed by the attachment bolts.

2. The aircraft of claim 1, wherein each wing includes an interior transverse rib, which is positioned between the lateral wing box thereof and the center wing box half thereof.

3. The aircraft of claim 1, wherein each center wing box half has a section which enlarges with proximity to the interior end thereof.

4. The aircraft of claim 1, wherein the frame wall of whichever of the first and second fuselage frames is located most rearward with respect to a longitudinal direction of the aircraft forms a front demarcation of a main-landing-gear compartment.

5. The aircraft of claim 1, wherein each of the first and second fuselage frames is attached to a load distributing plate, which has lateral edges that are attached to a fuselage skin.

6. The aircraft of claim 1, wherein the attachment bolts are oriented to extend in a direction that is parallel to a transverse direction of the aircraft.

7. The aircraft of claim 1, wherein the attachment bolts are distributed entirely along the interior ends of the two center wing box halves.

8. The aircraft of claim 7, wherein the interior ends of the two center wing box halves each have a rectangular general shape.

9. The aircraft of claim 1, wherein the interior end of each of the two center wing box halves has, on both interior and exterior surfaces thereof, attachment fittings, through which the attachment bolts extend.

10. The aircraft of claim 9, wherein at least one of the attachment fittings of the interior end of each center wing box half comprises:
   a first part, through which extends at least one of the attachment bolts that also extends through the intermediate wall;
   a second part, through which extends at least one additional bolt that also extends through the frame wall of one of the first and second fuselage frames; and
   a third part, through which extends at least one additional bolt that also extends through a box element of the center wing box half;
   wherein the first, second, and third parts of the attachment fitting are orthogonal with respect to one another, such that a corner fitting is formed by the first, second, and third parts.

11. The aircraft of claim 1, comprising a third fuselage frame, which has a lower part in a form of a frame wall, wherein the second fuselage frame is positioned between the first and the third fuselage frames according to a longitudinal direction of the aircraft, wherein the intermediate wall is a first intermediate wall, and wherein the frame wall of the second fuselage frame and the frame wall of the third fuselage frame are connected to each other by a second intermediate wall, which is positioned in the vertical midplane of the aircraft.

12. The aircraft of claim 11, wherein:
   the first and second intermediate walls are two pieces that are separate from one another, arranged on opposite sides of the frame wall of the second fuselage frame; or
   the first and second intermediate walls are produced as a unitary structure, on opposite sides of which two parts of the frame wall of the second fuselage frame are arranged.

13. A method for assembling an aircraft, the method comprising:
   providing two wings in a form of a wing unit, wherein each wing has a lateral wing box that extends toward an interior by a respective center wing box half;
   providing an intermediate wall in a vertical midplane of the aircraft, between the two center wing box halves;
   providing at least a first fuselage frame and a second fuselage frame, each of which have a lower part in a form of a frame wall;
   connecting the frame wall of the first fuselage frame and the frame wall of the second fuselage frame to each other via the intermediate wall; and
   assembling the two wings to one another using the attachment bolts, which link the interior ends of the two center wing box halves together, by passing through the intermediate wall.

14. The method of claim 13, wherein:
   the attachment bolts are distributed entirely along the interior ends of the two center wing box halves; and/or
   the interior ends of the two center wing box halves each have a rectangular general shape.

15. The method of claim 13, wherein:
   each wing includes an interior transverse rib, which is positioned between the lateral wing box thereof and the center wing box half thereof; and/or
   each center wing box half has a section which enlarges with proximity to the interior end thereof.

16. The method of claim 13, wherein the interior end of each of the two center wing box halves has, on both interior and exterior surfaces thereof, attachment fittings, through which the attachment bolts extend.

17. The method of claim 13, wherein:
   the frame wall of whichever of the first and second fuselage frames is located most rearward with respect to a longitudinal direction of the aircraft forms a front demarcation of a main-landing-gear compartment;
   each of the first and second fuselage frames is attached to a load distributing plate, which has lateral edges that are attached to a fuselage skin; and/or
   the attachment bolts are oriented to extend in a direction that is parallel to a transverse direction of the aircraft.

18. The method of claim 13, comprising:
   providing a third fuselage frame, which has a lower part in a form of a frame wall;
   wherein the second fuselage frame is positioned between the first and the third fuselage frames according to a longitudinal direction of the aircraft;
   wherein the intermediate wall is a first intermediate wall; and
   wherein the frame wall of the second fuselage frame and the frame wall of the third fuselage frame are connected to each other by a second intermediate wall, which is positioned in the vertical midplane of the aircraft.

19. The method of claim 18, wherein:
   the first and second intermediate walls are two pieces that are separate from one another, arranged on opposite sides of the frame wall of the second fuselage frame; or
   the first and second intermediate walls are produced as a unitary structure, on opposite sides of which two parts of the frame wall of the second fuselage frame are arranged.

20. The method of claim 19, wherein at least one of the attachment fittings of the interior end of each center wing box half comprises:
   a first part, through which extends at least one of the attachment bolts that also extends through the intermediate wall;
   a second part, through which extends at least one additional bolt that also extends through the frame wall of one of the first and second fuselage frames; and
   a third part, through which extends at least one additional bolt that also extends through a box element of the center wing box half;
   wherein the first, second, and third parts of the attachment fitting are orthogonal with respect to one another, such that a corner fitting is formed by the first, second, and third parts.

* * * * *